United States Patent Office 3,134,820
Patented May 26, 1964

3,134,820
ALICYCLIC ACETYLENIC CARBINOL AND
PREPARATION THEREOF
Martin A. Davis and Stanley O. Winthrop, both of Montreal, Quebec, Canada, assignors to American Home Products Corporation, New York, N.Y., a corporation of Delaware
No Drawing. Filed June 26, 1961, Ser. No. 119,351
1 Claim. (Cl. 260—618)

This invention is directed to a new chemical compound having pharmacological activity, and to its preparation from available starting materials.

More particularly, our novel chemical compound, characterized by hypnotic activity, is 5-hydroxy-5-ethynyl-dibenzo [a,d] [1,4] cycloheptadiene, which compound may be represented by the following structural formula:

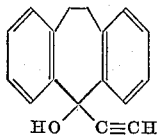

The compound, which is a crystalline solid, has shown marked activity as a hypnotic on oral administration in tests on animals. It also possesses activities characteristic of a sedative agent in potentiating the hypnotic effect of ethyl alcohol and in possessing anti-electroshock activity at doses substantially below those required to produce hypnosis.

Our new compound may be readily prepared by the interaction of dibenzo [a,d] [1,4] cycloheptadiene-5-one with an organometallic salt derived from acetylene. The organometallic salt derived from acetylene may be represented as $MC \equiv CH$, where M is a metal, or a metal derivative.

In our preferred reagent, M represents the metal lithium, and the organometallic salt is lithium acetylide. However, the group M may also be a magnesium derivative, as for example magnesium bromide. In this latter case the acetylenic derivative, $BrMgC \equiv CH$, is ethynylmagnesium bromide. It may be readily prepared in tetrahydrofuran solution in accordance with known procedures.

The organometallic salt derived from acetylene and the starting material, dibenzo [a,d] [1,4] cycloheptadiene-5-one, may be brought together in an inert solvent such as tetrahydrofuran or dry ether. The temperature at which the reaction is carried out is not critical as the reaction will proceed satisfactorily at room temperature. Ordinarily the reaction mixture is allowed to stand overnight, with agitation. The oxo atom in the 5-position of the dibenzo [a,d] [1,4] cycloheptadiene-5-one starting material is replaced by hydroxy and ethynyl groups in this position. Recovery of the resulting product presents no difficulties, and it may be purified by recrystallization from an organic solvent, such as hexane, in the usual manner.

Further details of our process for preparing the novel crystalline compound, having valuable pharmacological properties will be found in the illustrative examples which follow.

Example 1

Ethynylmagnesium bromide was prepared as described in Organic Syntheses 39, 56 (1959), from magnesium (4.0 g., 0.16 mol.), ethyl bromide (20.0 g., 0.17 mol.), and purified acetylene in dry tetrahydrofuran (150 ml.). Care was taken to insure that the apparatus used had been thoroughly dried.

A solution of dibenzo [a,d] [1,4] cycloheptadiene-5-one (25.0 g., 0.12 mol.) in tetrahydrofuran (30 ml.) was added dropwise at room temperature to the solution of the Grignard reagent and the mixture was allowed to stir overnight. The solid precipitate which had formed was filtered off and added to an excess of ice-cold ammonium chloride solution. The organic material was taken up in benzene, and the solution then washed with water and dried. Evaporation left an oil, which solidified on trituration with petroleum ether (B.P. below 40° C.). The product was 5 - hydroxy - 5 - ethynyldibenzo [a,d] [1,4] cycloheptadiene. There was thus obtained 7.7 grams of the compound.

The product was then dissolved in hexane, and recrystallization from this solvent afforded a pure sample of the acetylenic carbinol, M.P. 78–80° C. This product gave a positive test with ammoniacal silver nitrate and possessed, according to infra-red analysis, the desired acetylenic and hydroxyl groups.

Analysis confirmed the empiric formula $C_{17}H_{14}O$.

Required: C, 87.15%; H, 6.02%
Found: C, 87.46%; H, 6.06%

The tetrahydrofuran filtrate from the Grignard reaction was worked up in a similar manner and was found to contain a little of the desired product, along with unreacted ketone.

Example 2

A small crystal of ferric nitrate was added to liquid ammonia (400 ml.) followed by the addition of a few finely-divided pieces of lithium. Dry air was bubbled through the mixture for five minutes and the rest of the lithium (total 2.1 g., 0.3 mol.) was added in small portions over four hours. The occasional addition of small quantities of ferric nitrate was found necessary to maintain the rate of formation of the lithium amide.

When all the blue color had been discharged a current of purified acetylene was passed into the mixture for one and one-half hours to form lithium acetylide. Dibenzo [a,d] [1,4] cycloheptadiene-5-one (20.8 g., 0.1 mol.) was added dropwise, followed by dry ether (300 ml.). The reaction mixture was stirred overnight, treated with ammonium chloride (21 g.), which step was followed one-half hour later by careful addition of water.

The ethereal layer was separated and dried. Evaporation left 21.0 g., (90% yield) of 5-hydroxy-5-ethynyl-dibenzo [a,d] [1,4] cycloheptadiene. Its melting point, 78–79° C., remain unchanged upon recrystallization from hexane solution.

We claim:
5-hydroxy-5-ethynyldibenzo [a,d] [1,4] cycloheptadiene.

References Cited in the file of this patent

Nieuwland et al.: "The Chemistry of Acetylene" (1945), Reinhold Publishing Corp., New York, pages 81 to 82.

UNITED STATES PATENT OFFICE
CERTIFICATE OF CORRECTION

Patent No. 3,134,820                      May 26, 1964

Martin A. Davis et al.

It is hereby certified that error appears in the above numbered patent requiring correction and that the said Letters Patent should read as corrected below.

In the heading to the printed specification, in the title of invention, line 2, for "ALICYCLID" read -- ALICYCLIC --.

Signed and sealed this 17th day of November 1964.

(SEAL)
Attest:

ERNEST W. SWIDER                 EDWARD J. BRENNER
Attesting Officer                  Commissioner of Patents